United States Patent [19]
Moritz

[11] 3,809,468
[45] May 7, 1974

[54] FILM STRIP READER

[75] Inventor: Jules G. Moritz, Los Altos Hills, Calif.

[73] Assignee: Microform Data Systems, Inc., Menlo Park, Calif.

[22] Filed: Dec. 24, 1970

[21] Appl. No.: 101,219

[52] U.S. Cl. .................. 353/26, 353/27, 353/101
[51] Int. Cl. ..................... G03b 23/08, G03b 23/12
[58] Field of Search ............ 353/25, 26, 27, 23, 95, 353/68, 96, 101; 33/25 B

[56] References Cited
UNITED STATES PATENTS

| | | | |
|---|---|---|---|
| 2,130,562 | 9/1938 | Pratt | 353/27 |
| 1,052,835 | 2/1913 | Littman | 353/35 |
| 3,290,987 | 12/1966 | Sames et al. | 353/26 |
| 2,457,913 | 1/1949 | Nemeth | 353/23 |
| 3,006,245 | 10/1961 | Bycer et al. | 33/25 R |
| 3,692,398 | 9/1972 | Strauss | 353/26 |
| 3,424,524 | 1/1969 | Akiyama et al. | 353/27 |

FOREIGN PATENTS OR APPLICATIONS

| | | | |
|---|---|---|---|
| 901,705 | 8/1945 | France | 353/27 |

*Primary Examiner*—Harry N. Haroian
*Assistant Examiner*—Steven L. Stephan
*Attorney, Agent, or Firm*—Townsend & Townsend

[57] ABSTRACT

Apparatus for reading recorded informaton on a film strip of the type having a number of end-to-end segments with each segment having a plurality of information-containing image frames. The apparatus operates to move a particular segment of the film strip automatically into a fixed location near an optical system, the latter being movable relative to the fixed location by a pantograph assembly so that the optical path of the optical system can be aligned with any one of the image frames of the film strip segment at the fixed location. The optical system has a lens assembly movable over an optically flat surface of a window at the fixed location and the film strip is releasably clamped to the opposite, optically flat surface of the window to thereby provide for automatic focusing.

5 Claims, 8 Drawing Figures

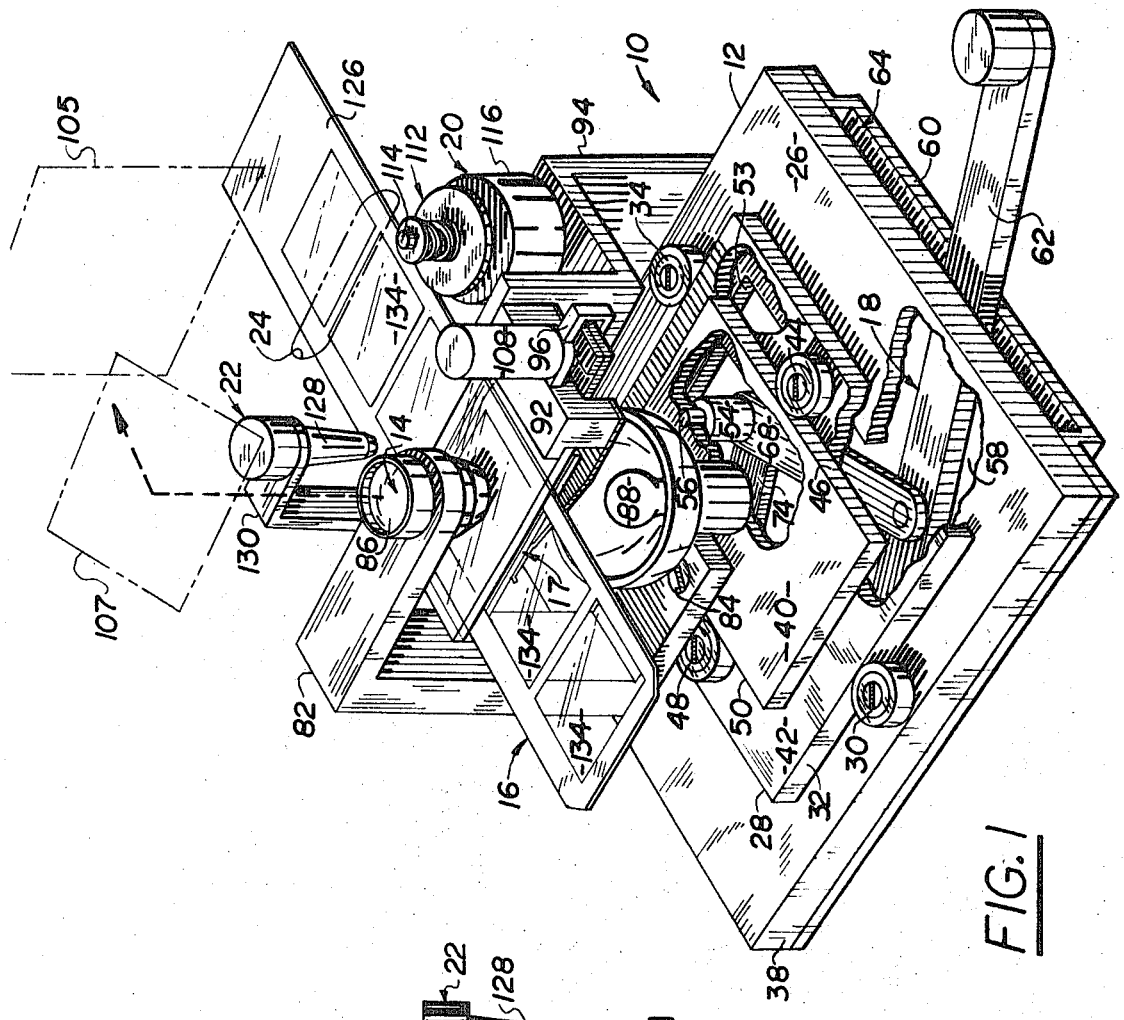
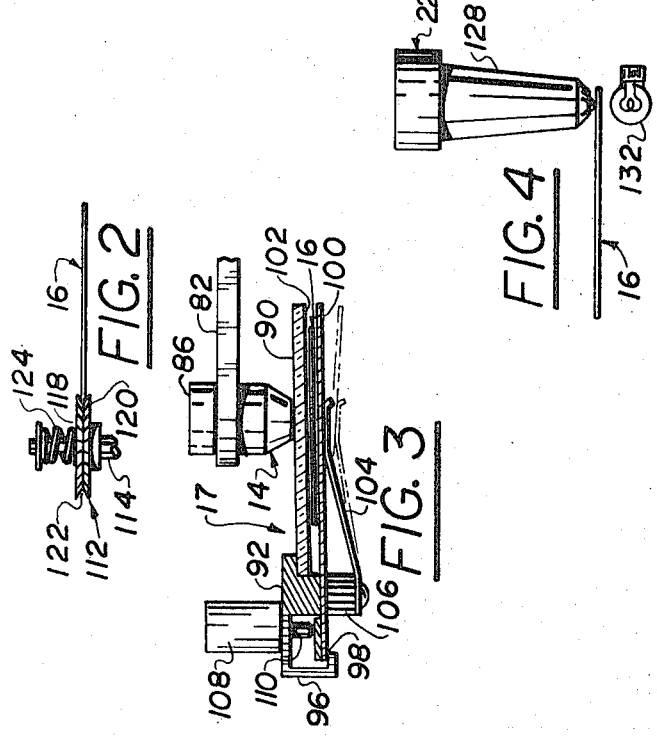
JULES G. MORITZ
INVENTOR.
BY
Townsend and Townsend

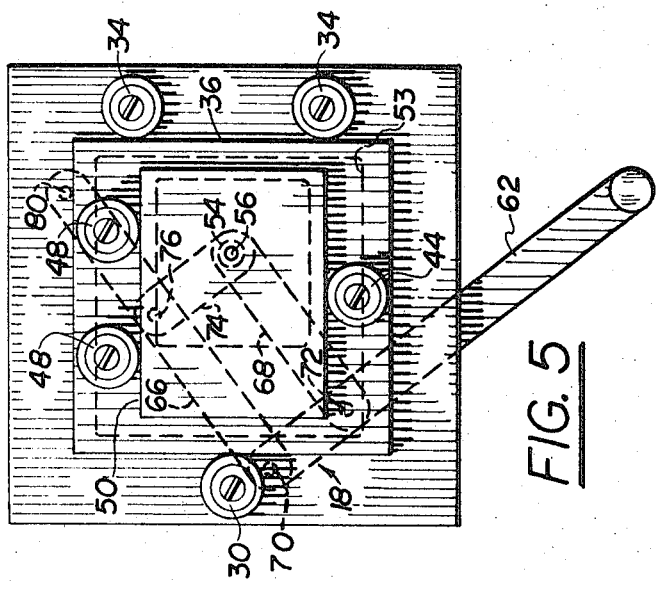
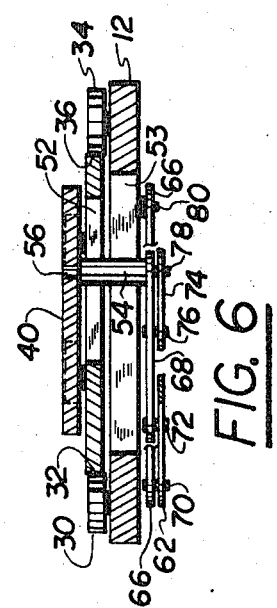
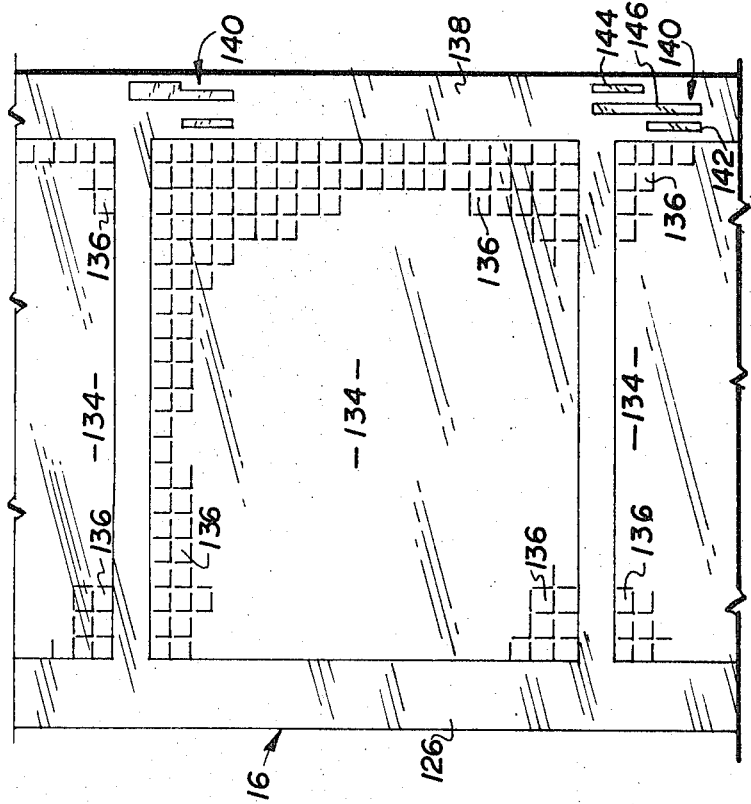

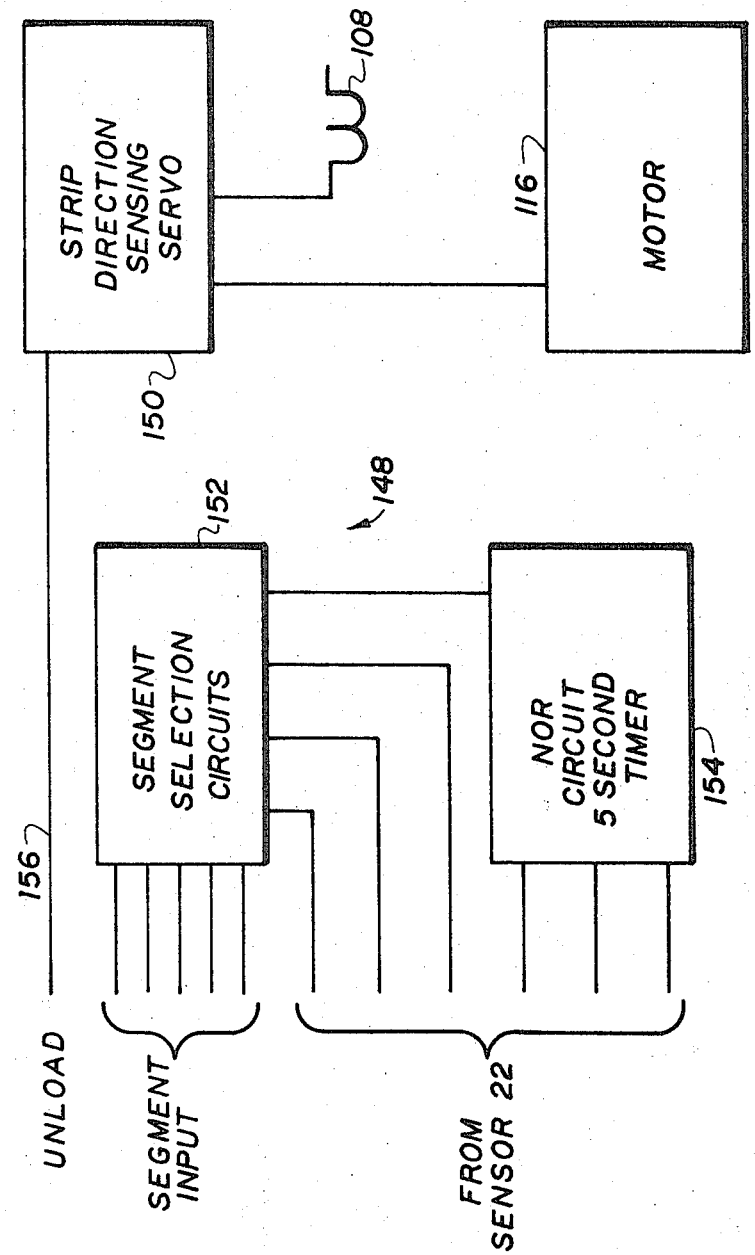

FILM STRIP READER

This invention relates to improvements in information retrieval techniques and, more particularly, to an improved apparatus for reading information from a film strip of the microfilm type.

Generally, microfilm readers have a fixed optical system for projecting images of microfilm strip onto a viewing screen, the film strips themselves being movable relative to the optical system. While such a technique is satisfactory for image frames of medium reduction, such as 40X or the like, it is not suitable for retrieving information from film strips having high reduction image frames of the order of 160X to 210X. Extreme precision in the film moving means must be required to achieve a relatively small film strip movement for a relatively large manual movement of the parts of the moving means itself. Moreover, focusing becomes a problem because the movable film strip may well have variations in thickness which causes the images thereon to move into and out of the focal plane of the fixed optical system itself.

The present invention provides an improved film strip reader which operates to releasably hold a film strip in a fixed position as the optical system itself moves relative to the film strip. The moving means coupled with the optical system is comprised of a pantograph assembly which gives a relatively small movement of the optical path of the optical system with a relatively large manual movement. The result is simplification of the structure for retrieving information at various locations on the film strip while minimizing focusing problems inasmuch as the film itself is not moved but rather the optical system is moved. The pantograph design also permits the operator to easily maintain the alignment of the rows and columns of image frames on a film strip as the operator of the reader moves the optical path of the optical system from one image frame to another in either the cine or comic display modes.

The reader of this invention is also provided with means for engaging a film strip for moving the same into a position with any one of a number of segments of the film strip adjacent to the optical system itself. Thus, the optical system can be manually moved to scan any one of a plurality of image frames on the segment adjacent to the optical system. The image of a selected image frame can then be projected onto a viewing screen immediately for viewing.

The film strip can be of the type having the segments thereof arranged in end-to-end relationship. Each such segment can be provided with coded indicia which can be sensed to generate a control signal for use in controlling the film strip moving means. The operator of the reader can program the same to cause a particular segment to be moved into the position at which the image frames of the segment can be scanned by the optical system. In this sense, the reader is semi-automatic in operation.

A further aspect of the invention is the provision of film strip hold-down means for releasably holding the film strip at a location at which a selected segment can be scanned by the optical system itself. Such hold-down means includes a window having opposed faces which are optically flat. The film strip is clamped against one of these faces and a lens assembly forming a part of the optical system can engage and slide over the opposite face of the window. In this way, focusing problems are minimized or substantially eliminated since the film is fixed and the window itself becomes a part of the optical system.

The primary object of this invention is to provide an improved film strip reader which has a shiftable optical system so that a film strip to be read can be secured in a fixed position as the optical system scans the film strip to move the optical path of the optical system into alignment with a particular image frame thereon.

Another object of this invention is to provide a film strip reader of the type described wherein a pantograph assembly is used to manually move the optical system relative to a fixed film strip to simplify the construction of the reader as well as to achieve a relatively small movement of the optical system for a relatively large manual movement.

A further object of this invention is to provide a reader of the aforesaid character which has an optical system which is automatically focused when the film strip to be read is moved into the fixed location to thereby eliminate the need for additional structure for focusing the system.

Still another object of this invention is to provide a film strip reader having a movable optical system which can be manually shifted relative to a film strip having a number of segments with each segment containing a plurality of image frames, wherein the reader has means for automatically positioning any one of the segments in alignment with the optical system and for moving the film strip to provide automatic access from a given row-column image address of one segment to the same row-column image address of another segment.

Other objects of this invention will become apparent as the following specification progresses, reference being had to the accompanying drawings for an illustration of an embodiment of the invention.

In the drawings:

FIG. 1 is a perspective view of the apparatus of this invention, showing a film strip in a position in which an image frame of the film strip can be projected;

FIG. 2 is a fragmentary, side elevational view of the film strip drive means of the apparatus;

FIG. 3 is a cross-sectional view of the film strip hold-down means of the apparatus;

FIG. 4 is a side elevational view, partly in schematic form, of the sensing unit for sensing indicia on a side margin of the film strip;

FIG. 5 is a fragmentary, top plan view of the apparatus with the optical system removed, showing the pantograph mechanism for shifting the optical system;

FIG. 6 is a cross-sectional view of the structure of FIG. 5;

FIG. 7 is an enlarged, fragmentary, plan view of the film strip, showing the spaced, coded areas thereon; and FIG. 8 is a block diagram of the control means of the apparatus.

The film strip reading apparatus of this invention is broadly denoted by the numeral 10 and is shown in FIG. 1. The apparatus includes a base plate 12, an optical system 14 which is used to project the image of an image frame of a film strip 16 onto a viewing screen, a film strip hold-down means 17 for releasably holding the film strip in a fixed location with respect to the base plate, a pantograph X-Y translation mechanism 18 for shifting the optical system with respect to hold-down means 17, drive means 20 for engaging a side edge of the film strip for advancing the same in opposed directions with respect to hold-down means 17, and a sensing unit 22 for sensing certain coded indicia on the film strip as the latter moves under the influence of drive means 20, the sensing of the indicia being sufficient to generate a control signal which is used to control the operation of drive means 20. Apparatus 10 is adapted to be disposed within a housing (not shown) having an access opening or slot 24 for receiving film strip 16 and allowing the same to move into coupled relationship with drive means 20. The position of slot 24 shown in FIG. 1 is merely for purposes of illustration only, it being understood that the slot may be further away from drive means 20 from that shown in FIG. 1. Also, the housing may be provided with guides which support the film strip after it has been partially inserted into slot 24 and before it is moved by drive means 20 toward holddown means 17. The film strip is generally longitudinally straight as shown in FIG. 1.

Base plate 12 has a flat, upper surface 26 over which a first translation plate 28 moves. A first roller 30 engages one side face 32 of plate 28 and a pair of second rollers 34 (only one of which is shown in FIG. 1) engages the opposite side face 36 of plate 28. Rollers 32 and 34 are also shown in FIG. 5. These rollers limit the movement of plate 28 to a pair of opposed directions, namely, the direction parallel to side face 38 of base plate 12 (FIG. 1).

A second translation plate 40 is movable over the flat, upper face 42 of plate 28. A second roller 44 mounted on upper surface 42 engages the adjacent side face 46 of plate 40 while a pair of spaced rollers 48 engage the opposite side face 50 of plate 40. Rollers 44 and 48 limit the movement of plate 40 to a pair of opposed directions which are perpendicular to the direction of movement of plate 28.

Plate 28 has a central opening 52 and base plate 12 has a central opening 53 (both openings being shown in dashed lines in FIG. 5). A stub shaft 54 extends through these two openings, opening 52 being smaller in size then opening 53.

Shaft 54 has an upper end 56 which is press-fitted or otherwise rigidly secured to plate 40. The lower end of stub shaft 54 is coupled to mechanism 18 so that manual movement of the latter can cause combined movements of plates 28 and 40 relative to base plate 12. The movement of stub shaft 54 is, of course, limited by the boundaries of central opening 52. Mechanism 18 is disposed below base plate 12 in a space 58 between the bottom surface of the base plate and the upper surface of a bottom plate 60. Mechanism 18 has a handle 62 which projects laterally of base plate 12 through an opening 64 defining the entrance to space 58. Opening 64 is disposed to permit handle 62 to extend outwardly from the housing in which apparatus 10 is disposed. Opening 64 may be disposed in a different location with respect to opening 24 through which the film strip enters the housing. For instance, openings 24 and 64 can be on a front face of the housing; whereas, in FIG. 1, they would be on different sides of the housing.

Mechanism 18 further includes a pair of parallel links 66 and 68 which are pivotally secured by pins 70 and 72 to handle 62 (FIG. 5). A short link 74 parallel with handle 62 is connected by pins 76 and 78 to links 66 and 68, respectively. Pin 76 is intermediate the ends of link 66, the latter being pivotally secured by a pin 80 to base plate 12. Stub shaft 54 is secured to link 68 and is coaxial with pin 78. Thus, mechanism 18 is secured at only one location to the base plate and is connected at only one location to plate 40. Mechanism 18 moves across the upper surface of bottom plate 60 and can be moved into and out of opening 64 as well as from side to side in opening 64.

A C-shaped yoke 82 is rigidly secured by a pin 84 to plate 40 and extends upwardly therefrom. The yoke supports a lens assembly 86 at its upper end, the lens assembly defining a part of optical system 14. Another part of the optical system is a light source 88 mounted in any suitable manner on plate 40 below hold-down means 17. Source 88 is in alignment with lens assembly 86 so that they define an optical path which is movable into alignment with a specific image frame on film strip 16 held in a fixed location by hold-down means 17. Movement of plates 28 and 40 under the influence of the pantograph mechanism 18 operates to shift the optical system with respect to hold-down means 17.

Hold-down means 17 includes an upper, transparent window 90 rigidly secured in any suitable manner to a bracket 92 rigid to a support 94 (FIG. 1) extending upwardly from base plate 12. Bracket 92 has a C-shaped extension 96 (FIG. 3) which defines a pivot point 98 for one end of a second transparent window 100 located below window 90 and urged against the bottom surface 012 thereof by a pair of leaf springs 104 secured to respective posts 106 of bracket 92 (only one post 106 being shown in FIG. 3). A solenoid 108 mounted on bracket 92 has an armature 110 which bears against a pad on the upper surface of window 100 at a location spaced from pivot point 98 to cause window 100 to pivot downwardly and into the dashed line position of FIG. 3 when the solenoid is energized. This causes a space to be formed between windows 90 and 100 for receiving film strip 16 and the latter can be moved into this space under the influence of drive means 20 when it is desired to read certain information on the film strip. When the solenoid is de-energized, armature 110 retracts and springs 104 urge window 100 upwardly to force the film strip against the bottom surface 102 of window 90. Surface 102 is optically flat so that this action brings the film strip into focus automatically with respect to lens assembly 86. Also, window 100 protects the film strip against the damage due to the heat from light source 88.

Window 90 has an optically flat upper surface 103 which is engaged by the lower end of lens assembly 86 (FIG. 3). The lens assembly slides over surface 103 as the optical system is moved relative to hold-down means 17. In this way, the lens assembly always remains in a fixed plane with respect to the film strip held by hold-down means 17 to thereby keep the film strip in the focal plane of the optical system as the latter is moved relative to the film strip.

The optical system operates to project the image of an image frame on the film strip onto a viewing screen 105. A mirror 107 can be used in the optical path of the optical system to direct the image onto screen 105.

Drive means 20 includes a rotor 112 mounted on the drive shaft 114 of a reversible drive motor 116 mounted on support 94. Rotor 112 is defined by a pair of relatively shiftable disks 118 and 120 (FIG. 3) whose outer peripheries are beveled to present a substantially V-shaped groove 122 in the outer periphery of rotor 112. A coil spring 124 surrounding shaft 114 above disk 118 biases the latter into face-to-face engagement with disk 120.

Rotor 112 is positioned with respect to opening 24 and the guide means (not shown) of the housing in which apparatus 10 is disposed such that a side margin 126 of film strip 16 moves into frictional engagement with the rotor within groove 122 thereof when the film strip is intially positioned in the housing through opening 24. Disk 118 can move axially of shaft 114 as the film strip enters groove 122 so that the side margin of the film strip is pinched slightly between the two disks.

Sensing means 22 comprises a sensor 128 mounted on a bracket 130 (FIG. 1) secured in any suitable manner to base plate 12. Sensor 128 is in optical alignment with a light source 132 disposed below the path of travel of film strip 16 so that images of certain coded indicia on the film strip can be projected into the sensor for sensing thereby. Sensor 128 has a number of photocells therein which develop control signals for controlling the operation of motor 116 in a manner to be described.

Film strip 16 has a number of segments 134 disposed in end-to-end relationship along the length thereof. For purposes of illustration, there are five such segments 134 on the film strip. As shown in FIG. 7, each film strip segment 134 has a plurality of high-reduction image frames 136 arranged in a row-column fashion. Again, for purposes of illustration, there are 420 such image frames 136 for each segment 134, respectively.

The opposite side margin 138 of the film strip has a number of spaced, coded areas 140, there being a code area 140 for each segment 134, respectively. Each coded area 140 has indicia thereon to be sensed by sensor 138 as the film strip moves under the influence of drive means 20. For purposes of illustration, the sensor has two nulling photocells (not shown) which sense a pair of outer bands 142 and 144 of each area 140. These two photocells generate control signals which center a desired segment with respect to hold-down means 17. Sensor 128 has three additional photocells which sense intermediate bands 146 between bands 142 and 144 of the coded areas 140, the arrangement of one or more bands 146 at each area 140 determining a specific number, such as a binary number, representing a corresponding segment 134. Thus, when a segment is selected by an input means to be described, the sensor operates until it senses the information of a particular coded area 140 corresponding to the selected segment 134. During the sensing step, the film strip is being moved by drive means 20 and, as soon as the selected segment is determined, drive means 20 is deactuated to stop the film strip movement. The coded areas 140 can be longitudinally staggered with respect to their respective segments 134, if desired.

The control means for apparatus 10 is denoted by the numeral 148 and is shown in FIG. 8. The control means includes a servo unit 150 coupled with motor 116 so as to provide the output signal necessary to drive the motor in either of two directions. Servo 150 is controlled by the output signal of segment selector circuitry 152 having five inputs from a suitable input device, such as a manually actuated keyboard. The keyboard can be mounted on the housing in which apparatus 10 is disposed and at a location permitting manual access to the keys thereof.

Circuitry 152 is also coupled to sensor 128 and to a timer 154, the latter being coupled to the sensor also. Circuitry 152 includes a comparator which compares an input signal derived from a particular segment selection with the signals from the three photocells of sensor 128. Before a comparison is made, circuitry 152 has an output signal which drives servo 150 to effect operation of motor 116. When the comparison is made between the input signal and the control signal from the sensor, the output signal from circuitry 152 falls to zero to cause motor 116 to be de-energized.

Timer 154 operates to de-energize motor 116 if the film strip has not been loaded into the apparatus within a specific time interval, such as five seconds, after a segment selector circuitry input has been directed into circuitry 152. Servo 150 can be provided with an "unload" input on line 156 in by-passing relationship to circuitry 152 to cause motor 116 to extract the film strip from the unit. Solenoid 108 is also coupled with servo 150 to enable the same only when the solenoid is actuated and when window 100 is in the dashed line position of FIG. 3.

OPERATION

Apparatus 10 is placed in operation by first inserting the film strip into the housing through opening 24. The film strip will be guided into engagement with rotor 112 and will frictionally engage the same. The operator of the apparatus will select a particular segment of the film strip, which segment has the image frame or frames to be viewed. The selection is made by, for instance, actuating a key or push-button of a keyboard which generates an input signal in circuitry 152 causing an output signal of circuitry 152 to be directed to servo 150. The servo will then effect operation of motor 116 in the proper direction to move the film strip toward hold-down means 17. Prior to the movement of the film strip, solenoid 108 will have been energized to move window 100 away from window 90, thus permitting the film strip to be moved between the windows. As the film strip moves toward hold-down means 17, sensor 128 senses the coded indicia at coded areas 140 on the film strip. The sensing step generates control signals which are directed to circuitry 152 at which they are compared with the input signal. When a comparison is reached, the output signal of circuitry 152 will fall to zero, thus causing motor 116 to be de-energized. The selected segment of the film strip will then be centrally located with respect to hold-down means 17. Solenoid 108 is then de-energized so that springs 104 force window 100 upwardly to, in turn, force the film strip against the bottom surface 102 of window 90. The operator can manipulate handle 62 until he finds the desired image frame of the segment aligned with the two windows. Source 88 will generally be on at all times so that any image frame aligned with the optical path of the optical system will be immediately projected onto the viewing screen (not shown). Also, the image frame will be in focus since the film strip is fixed by the two windows relative to the focal plane of the optical system.

If it is desired to move from one segment to the other, the operator depresses the key of the desired segment and motor 116 is energized to move the film strip to the new location. Solenoid 108 will have been energized prior to the movement of the film strip to permit it to be moved relative to hold-down means 17. It is to be noted that the movement of the film strip from one segment to another in this manner causes movement from a given row-column image address of one segment to the same row-column image address of the other segment. This permits the use of the apparatus as a restricted automatic access unit for properly structured limited data basis.

The pantograph construction of mechanism 18 provides far easier and accurate manipulation then conventional film strip readers designed for high-reduction image retrieval. This is accomplished through the use of a mechanical advantage design with a relatively large ratio of hand movements to that of the optical path of optical system 14.

The automatic focusing feature achieved with hold-down means 17 provides automatic focusing over a wide range of variations in film thicknesses. This feature minimizes the need for operator focusing during use and the apparatus can be provided with manual focusing means (not shown), if desired.

Since rotor 112 engages only the side edge of the film strip, it does not mar or otherwise affect the emulsion surface of the film strip. This permits the use of film strips having unprotected film emulsions to thereby provide a major reduction in film dissemination costs. Drive means 20 also requires no adjustment with time and wear and has a minimum of moving parts. If the rotor experiences a certain degree of slippage relative to the film strip, this will not affect the operation of appartus 10 since this slippage is not critical inasmuch as motor 116 will continue to operate until the comparison of the input and control signals determines that the proper segment has been positioned in hold-down means 17.

The mechanical advantage of mechanism 18 (large hand movement to small optical movement) permits the use of film hold-down means 17 while allowing the optical path of the optical system to be quickly and easily moved from one image frame in a segment to another image frame of the same segment. It also permits the use of a single loading opening 24. The pantograph design also permits the operator to easily maintain the alignment of the rows and columns of image frames as he moves the optical system from one image frame to another in either the cine or comic display modes.

I claim:

1. Apparatus for reading information recorded on a film strip having a plurality of image frames comprising: means for releasably holding the film strip in a fixed location; means adapted to engage one side edge of the film strip and responsive to the position of the same along a predetermined path aligned with said location for moving the same along said path; an optical system having an optical path; means for mounting the optical system for movement in two degrees of freedom with respect to the fixed location and in a position with the optical path thereof intersecting said fixed location, whereby the optical path can be moved into and out of optical alignment with any one of the image frames at said location; and pantograph means coupled with said mounting means for manually shifting the same to thereby move the optical path relative to said fixed location.

2. Apparatus for reading recorded information on a film strip having a number of end-to-end segments with each segment having a number of image frames thereon comprising:
    operable means engageable with the edge of the film strip for moving the same along a predetermined path;
    means aligned with the path at a fixed location along the same for releasably clamping the film strip against movement relative thereto;
    means responsive to the position of the film strip along said path for controlling the operation of said moving means, whereby any one of the segments of the film strip can be moved to said fixed location;
    an optical system having an optical path;
    means mounting the optical system for movement in two degrees of freedome relative to said clamping means, whereby the optical path can be moved into alignment with any one of the image frames of the segment at said fixed location; and pantograph means coupled with said mounting means for manually moving the same relative to the location.

3. Apparatus as set forth in claim 2, wherein said drive means includes a rotor engageable with a side edge of the film strip and rotatable about an axis perpendicular to the film strip, and a reversible drive motor for rotating the rotor in opposed directions.

4. Apparatus as set forth in claim 2, wherein said pantograph means includes a pantograph device, a first plate mounted for movement in opposed directions in a first plane, a second plate mounted for movement on the first plate in opposed directions mutually perpendicular to the directions of movement of the first plate, and yoke means connecting the pantograph device to the second plate, said optical system being mounted on the second plate.

5. Apparatus as set forth in claim 4, wherein is included a third plate, the first plate being movable over the third plate, said pantograph device being below the third plate, the first and third plates having respective openings, said connecting means extending through the openings.

* * * * *